H. W. JACOBS.
SUPERHEATER.
APPLICATION FILED OCT. 18, 1912.
1,125,690.
Patented Jan. 19, 1915.
7 SHEETS—SHEET 1.
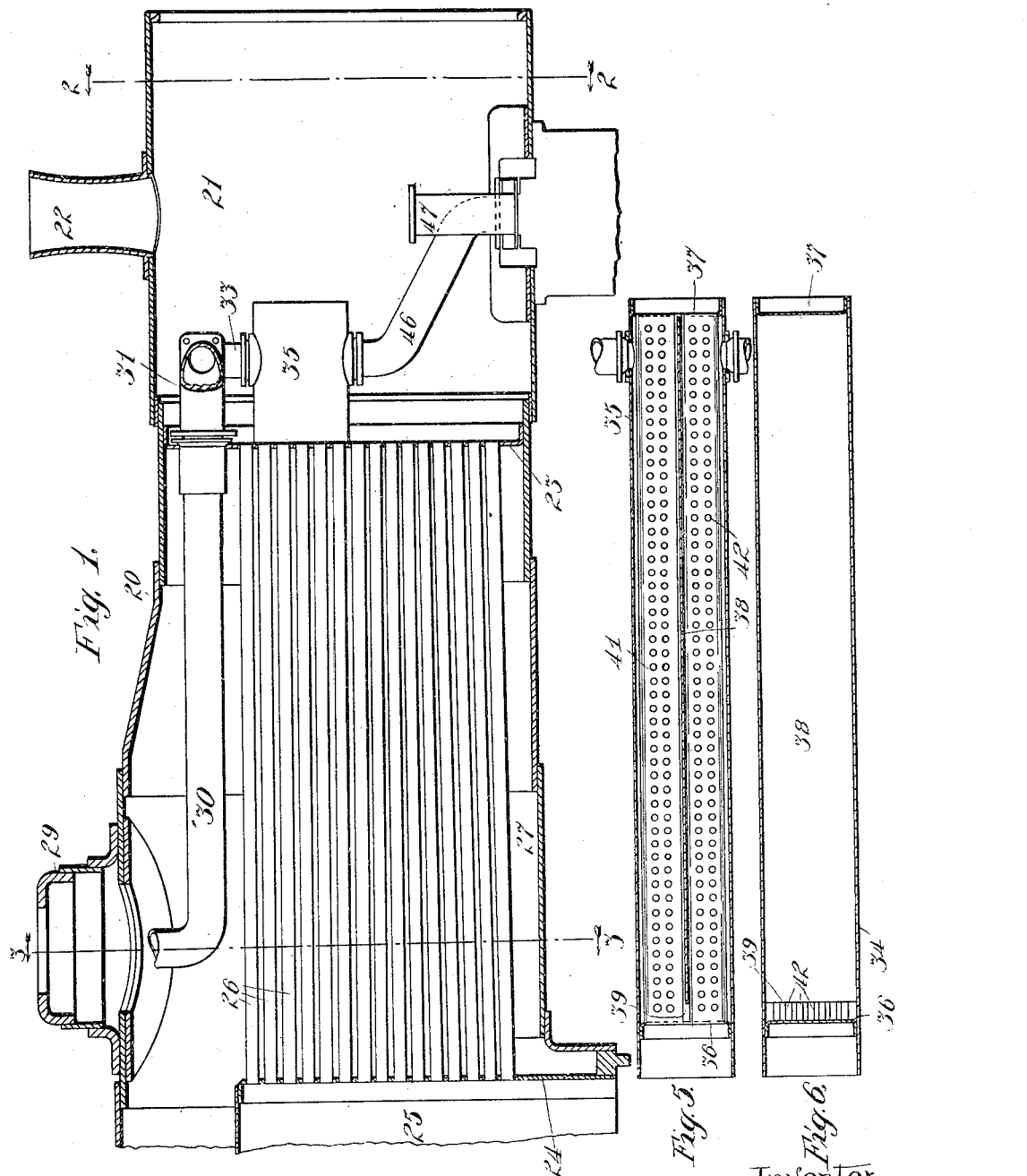

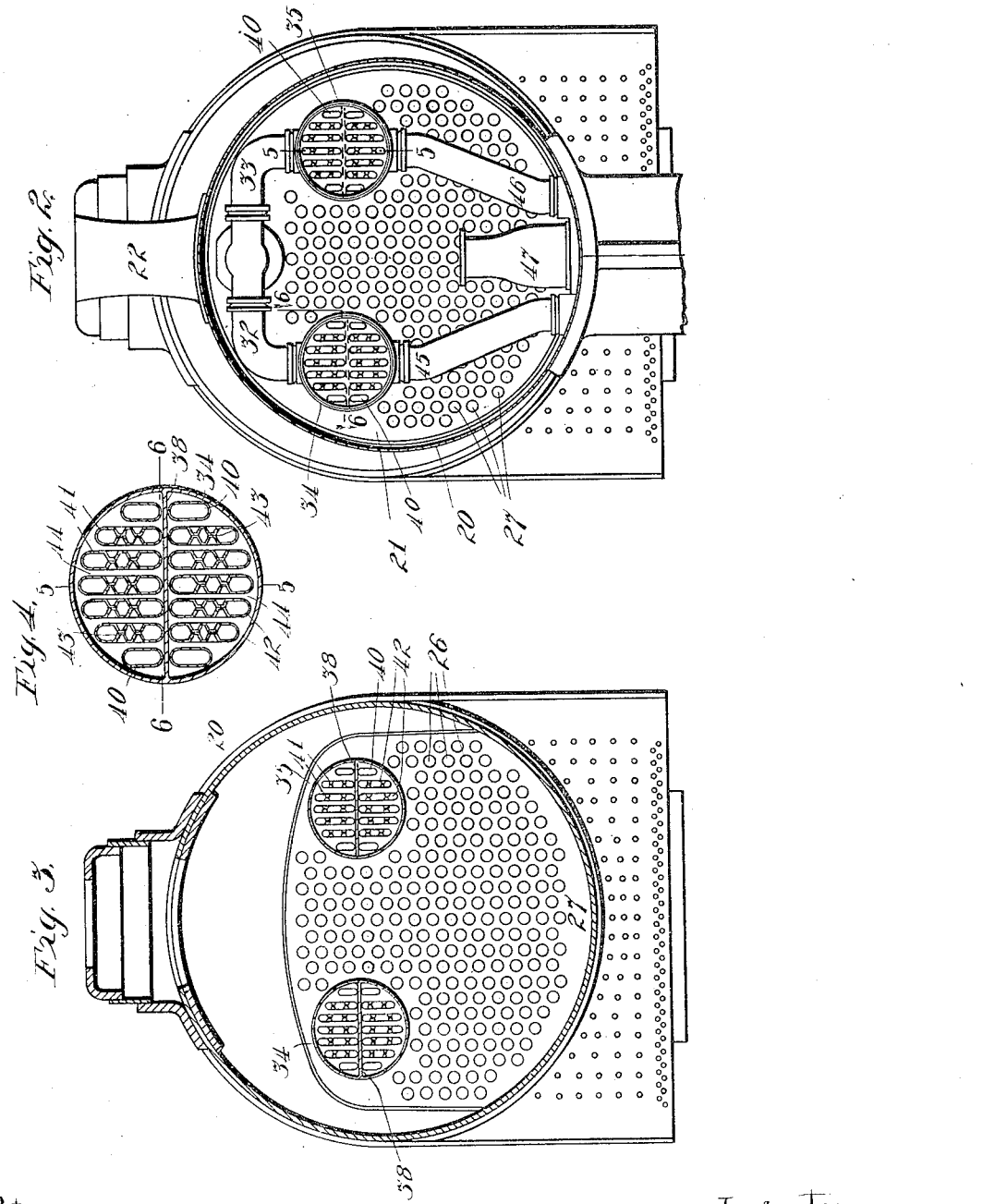

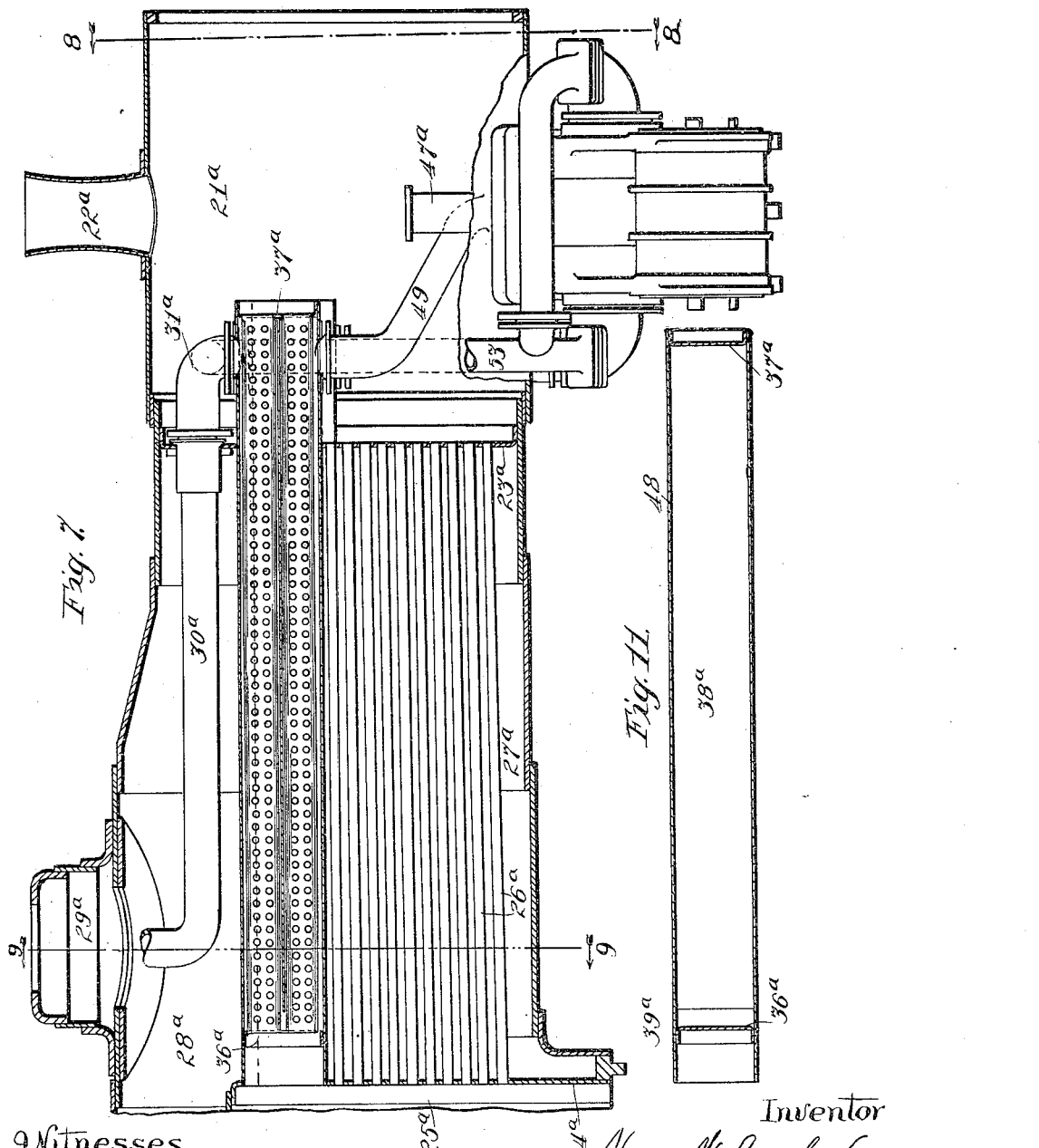

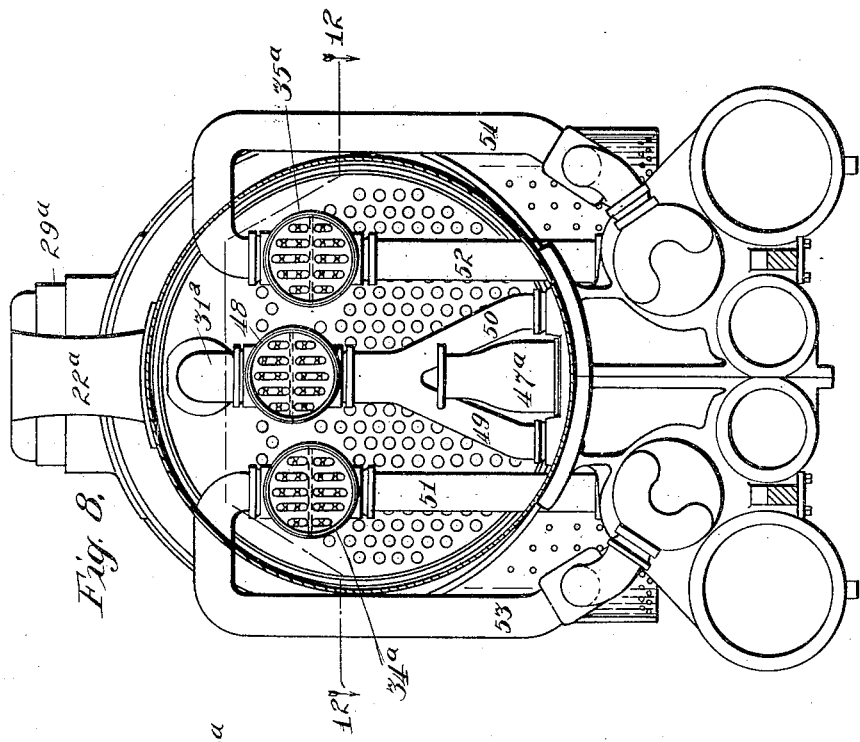
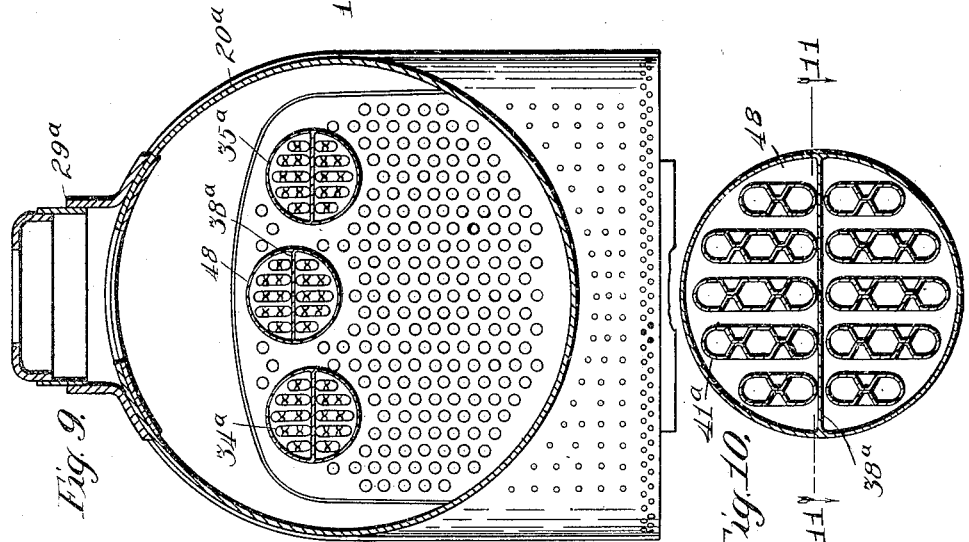
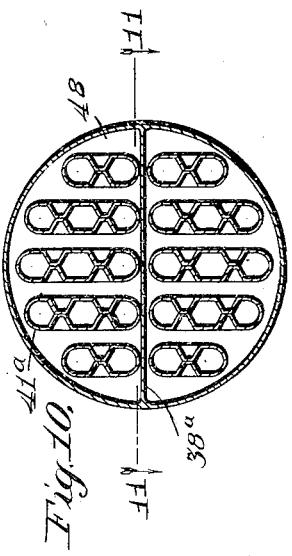

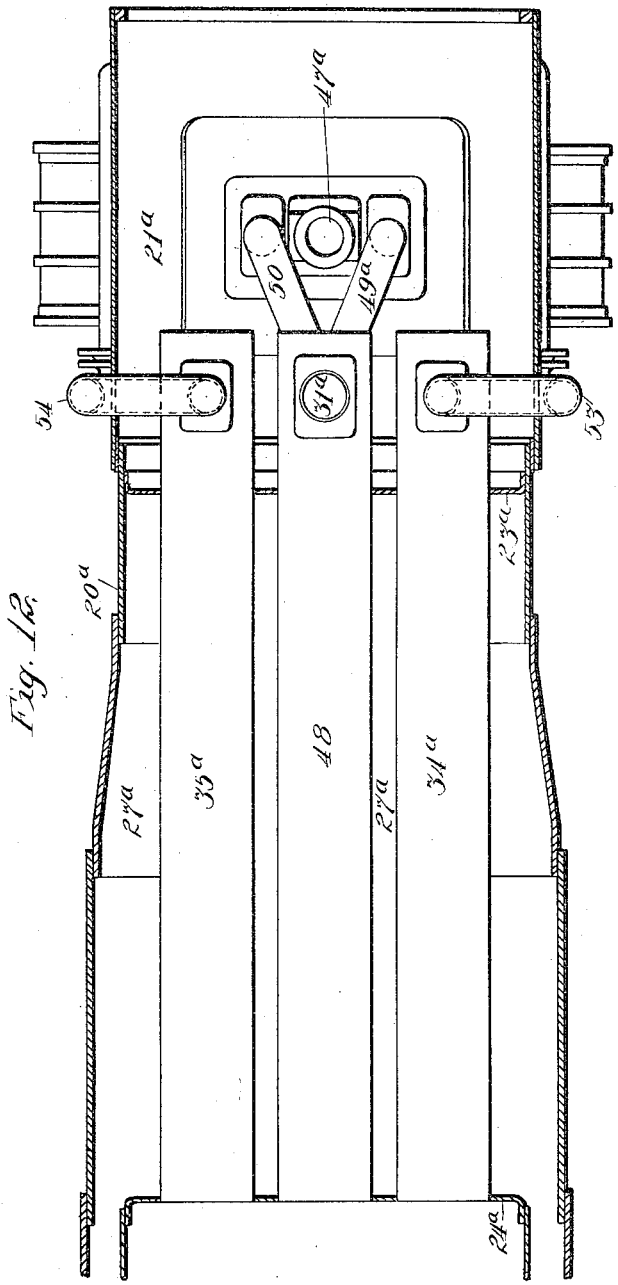

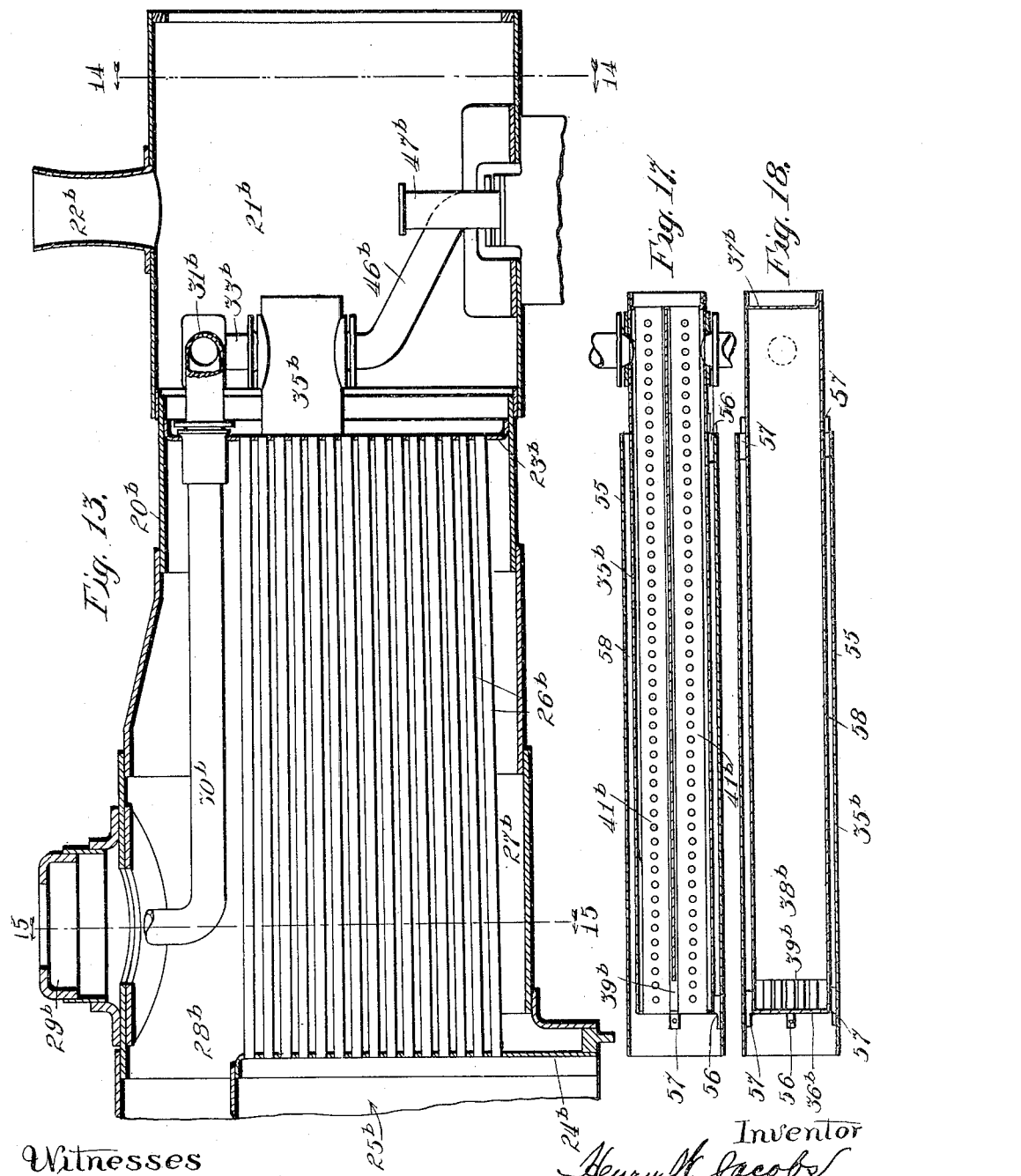

H. W. JACOBS.
SUPERHEATER.
APPLICATION FILED OCT. 18, 1912.
1,125,690.
Patented Jan. 19, 1915.
7 SHEETS—SHEET 7.
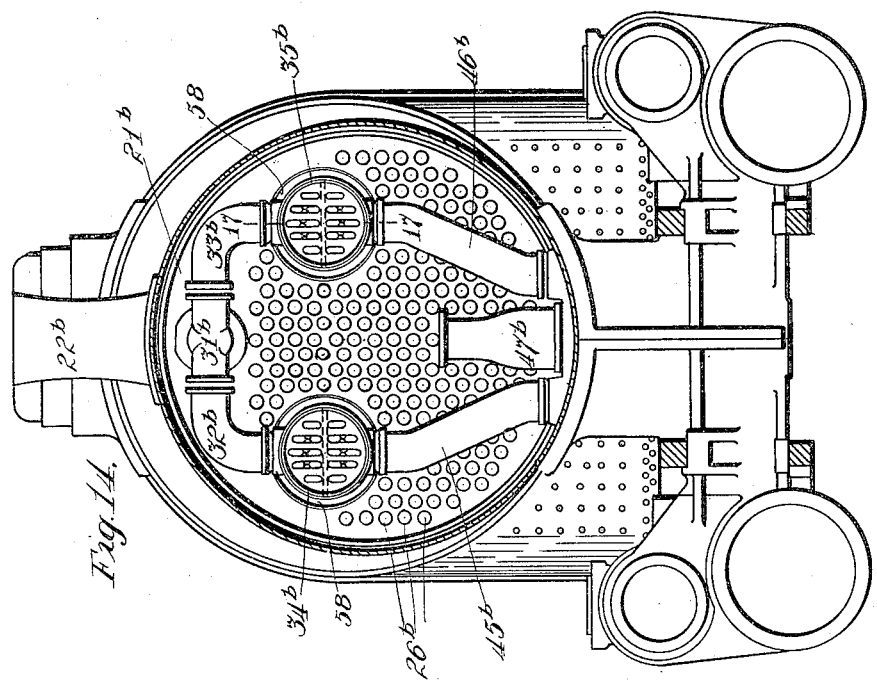
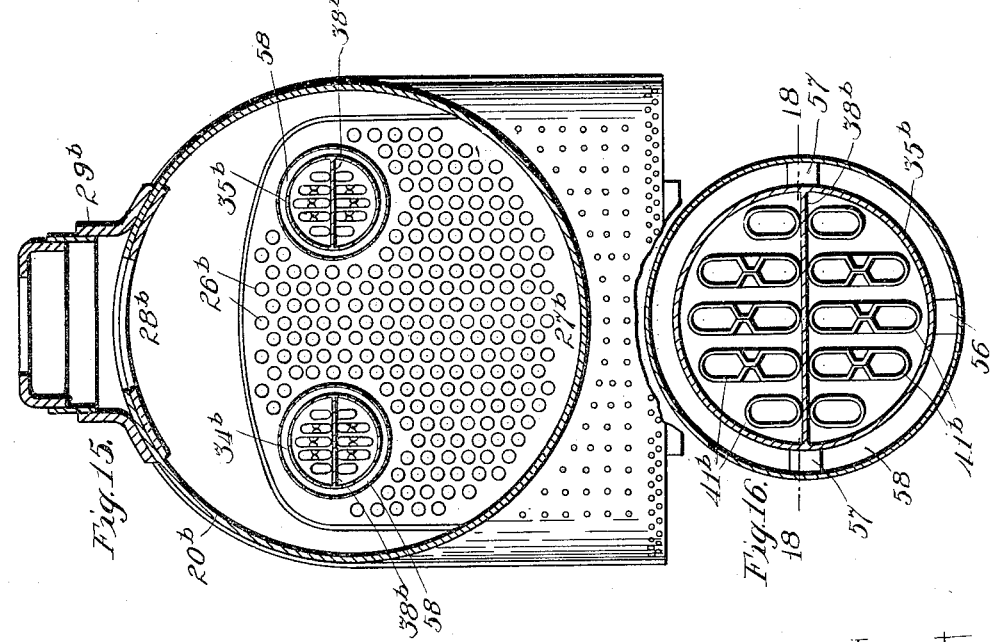
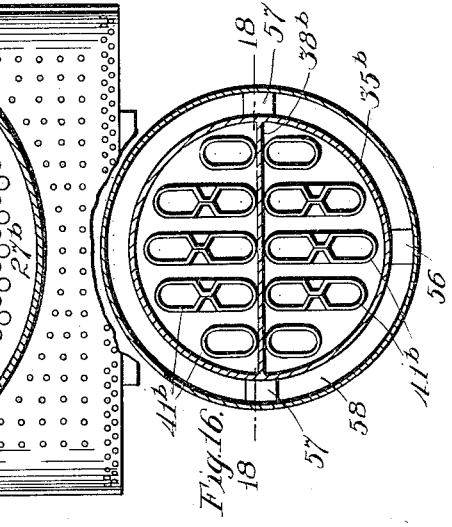

UNITED STATES PATENT OFFICE.

HENRY W. JACOBS, OF TOPEKA, KANSAS.

SUPERHEATER.

1,125,690.

Specification of Letters Patent. Patented Jan. 19, 1915.

Application filed October 18, 1912. Serial No. 726,487.

*To all whom it may concern:*

Be it known that I, HENRY W. JACOBS, a citizen of the United States, and a resident of Topeka, in the county of Shawnee and State of Kansas, have invented certain new and useful Improvements in Superheaters, of which the following is a description, reference being had to the accompanying drawings, which form a part of my specification.

My invention relates to superheaters more especially intended for use in locomotive-boilers; and has for its object the provision of means having the greatest effective superheating surface obtainable whereby the steam may be superheated to a sufficient degree of superheat and thus result in a higher economy of fuel and water than is the case with the type of superheaters at present in use.

A further object of my invention is to provide a superheater which may be readily applied to the boilers of locomotives at present in service without necessitating extensive changes or alterations in the boiler construction; the invention resulting in a superheater, the initial cost, as well as the maintenance cost whereof, will be a minimum.

Another object of my invention is to provide a superheater, the application of which to a locomotive-boiler will not decrease the water capacity, or flue heating surface for the generation of steam, to a point where the boiler would not supply sufficient steam for the cylinders commensurate with all speeds of operation without overworking the boiler, as such action would result in the increasing of repairs of the same. The invention possesses other advantages which will be apparent from the detailed description of the various modifications illustrated in the drawings, wherein:—

Figure 1 is a longitudinal vertical sectional view of a locomotive-boiler, forward of the fire-box, provided with my improved superheater. Fig. 2 is a vertical sectional view taken on the line 2—2 of Fig. 1 and looking in the direction of the arrows. Fig. 3 is a similar view taken on the line 3—3 of Fig. 1 and looking toward the fire-box end of the locomotive as indicated by the arrows. Fig. 4 is an enlarged cross section of one of the superheater units as shown in Fig. 3. Fig. 5 is a longitudinal vertical sectional view take on the line 5—5 of Fig. 2. Fig. 6 is a longitudinal sectional plan view taken on the line 6—6 of Fig. 2 and looking downward in the direction of the arrows. Fig. 7 is a vertical longitudinal sectional view of a locomotive-boiler provided with a modified form of my invention adapted to a compound type of locomotive. Fig. 8 is a vertical cross section taken on the line 8—8 of Fig. 7, and looking in the direction of the arrows. Fig. 9 is a similar view taken on the line 9—9 of Fig. 7, looking toward the fire-box end of the boiler as indicated by the arrows. Fig. 10 is an enlarged sectional view of one of the superheater shells or units as shown in Fig. 9. Fig. 11 is a sectional plan view of one of the superheater units or shells taken on the line 11—11 of Fig. 10 and looking downwardly. Fig. 12 is a longitudinal cross sectional view taken on the line 12—12 of Fig. 8, showing a plan of the superheater units. Fig. 13 is a longitudinal vertical sectional view of a locomotive-boiler provided with still another modified form of my invention. Fig. 14 is a vertical cross sectional view taken on the line 14—14 of Fig. 13 and looking in the direction of the arrows. Fig. 15 is a similar view taken on the line 15—15 of Fig. 13 and looking in the direction of the fire-box end of the locomotive as indicated by the arrows. Fig. 16 is an enlarged cross sectional view of one of the superheater units or shells as illustrated in Fig. 15. Fig. 17 is a longitudinal vertical sectional view taken on the line 17—17 of Fig. 14. Fig. 18 is a longitudinal sectional plan view of one of the superheater units taken on the line 18—18 of Fig. 16 and looking downwardly.

In the exemplification of my invention, as illustrated in the first six figures of the drawings, the invention is shown applied to an ordinary or simple type of locomotive in which 20 represents the boiler shell provided with a smoke-box 21, which is provided with the usual smoke-stack 22 whereby the gases of combustion are permitted to escape into the atmosphere. The rear wall of the smoke-box consists of the front flue sheet 23, and 24 constitutes the rear or fire-box flue sheet which also forms one wall of the fire-box 25 from which the gases of combustion pass through the boiler flues 26, the ends of the latter being properly secured in the flue sheets 23 and 24 with the water space 27 surrounding the flues. The boiler shell is constructed with the steam-dome 29 in which the usual throttle is located but which is not shown in the drawings. Leading from the throttle, and forwardly in the boiler shell, is a steam-pipe or conduit 30 which extends through the front flue sheet 23 and is connected at its forward end to a T pipe or branched connection 31 which is located in the smoke-box 21; the construction of the connection 31 being more clearly shown in Fig. 2. All of these parts of the boiler are assembled and secured together according to the methods and practices well known and established in the art of locomotive building and, therefore, require no further explanation. Connected to the T pipe connection 31 are a pair of steam pipe elbows 32 and 33, the other ends whereof are connected to the superheating shells or units 34 and 35, see Fig. 2. The superheater units or shells 34 and 35 are identical in construction and, therefore, the description of one shell or unit will suffice. The superheater units preferably consist of large cylindrical shells, considerably larger in diameter than the ordinary boiler flues 26, and are arranged to extend through the water space of the boiler with the rear ends thereof secured in proper openings provided in the rear or fire-box flue sheet 24, while the forward ends of the shells or units are preferably arranged to extend through the front flue sheet 23 and into the smoke-box 21. The units or shells may be secured in the flue sheets in the same manner as the boiler flues 26 so as to form tight connections; the shells, however, being preferably welded to the flue sheets as illustrated in the drawings.

The ends of the shells or units are provided with flanged heads or individual flue sheets 36 and 37 which are preferably welded in place. I prefer to have the heads or flue sheets 36 secured within the units or shells somewhat forward of the fire-box ends of the units in order that the heads or individual flue sheets may be somewhat removed from the extremely hot gases of the fire-box, as more clearly shown in Figs. 5 and 6.

The units or shells 34 and 35 are divided into two compartments extending lengthwise of the tubes or shells by a partition or wall 38, more clearly shown in Figs. 4, 5, and 6. In the exemplification of my invention the partition or wall 38 is arranged to extend horizontally and so as to provide an upper and lower compartment in each tube or shell; with the rear or fire-box end of the partition or wall coming short of the head or small flue sheets 36, or provided with a cut-away portion, as clearly shown at 39 in Figs. 5 and 6, thus providing communication between the upper and lower compartments of each shell or unit. The partition or wall 38 is preferably of the same thickness of material as the walls of the shells or units, and may be made integral therewith, thus also affording means whereby the shells or units are made self-sustaining and prevented from collapsing. The partition or wall 38 is secured at the front end of the superheater shell or unit to the front head or small flue sheet 37 so as to form a steam tight connection.

The heads or small flue sheets 36 and 37 are shown provided with oblong slots at 40, see Fig. 2, which are preferably arranged in parallel series at points above and below the intermediate wall or partition 38. Both compartments of the shells or units are provided with the oblong or transversely elongated flues 41 and 42, the ends whereof are inserted into the slots in the heads 36 and 37, and secured thereto preferably by welding or in any other manner. The flues 41 and 42 convey products of combustion from the fire-box of the locomotive through the superheater units or shells and into the smoke-box 21 and thus provide heating surfaces within the shells or units. In my preferred form of construction, the flues just referred to are made of flat sheet metal previously provided with the desired number of impressions, preferably symmetrically arranged; the sheet is then bent into the oblong or transversely elongated flue, as more clearly shown in Fig. 4, with the impressions, or the studs or teats resulting therefrom, arranged on the inside of the flue and at points directly opposite each other, as clearly shown at 43, see Fig. 4. The inner edges or points of the registering studs are brought into close proximity with each other and prevent the side walls collapsing. The abutting edges of the sheets are then welded together while the ends of the flues are inserted into the oblong slots of the individual heads or flue sheets 36 and 37 and preferably welded into place. The spaces 44 intermediate of and surrounding the flues are adapted to receive the steam which it is intended to superheat. This arrangement and construction of the flues will compel the steam passing through the superheating means to take a thin sheet like form whereby practically every particle of steam will be brought into contact with a heating surface, with the result that the steam will absorb a maximum amount of heat in a minimum amount of travel.

The lower forward ends of the superheater units or shells 34 and 35 are provided with the steam conveying conduits or pipes 45 and 46, respectively, which communicate with the steam-chests of the oppositely disposed cylinders of the locomotive.

In practice, the boiler is provided with water in the usual manner through a boiler check, which is not shown, and the steam in the steam space 28 rises into the dome 29 where its passage into the steam pipe 30 is controlled by the usual throttle. The steam from pipe 30 flows forward into the header or T connection 31 where it divides and passes into the respective superheater shells or units 34 and 35, that is into the compartment located above the intermediate wall or partition 38 of each unit. The steam admitted to the upper compartment of the two shells or units passes backward between the flues until it reaches the fire-box end of the two shells or units and then passes downward through the passage or opening 39 and into the rear end of the lower compartment of each shell or unit 34 and 35, flowing forward until it reaches the forward or smoke-box ends of the two shells or units 34 and 35 from whence it will be conveyed to the steam-chests of the cylinders by means of the steam conduits or pipes 45 and 46 respectively. As is apparent from the construction shown and described, the narrow spaces between the flues in the upper and lower compartments, compel the steam to pass through the superheater shells or units in a thin stream like form, thereby subjecting all the steam to the superheating surfaces, thus resulting in the high superheating of the steam. The steam exhausted by the cylinders is exhausted through exhaust pipe 47 in the usual manner and out through the stack 22.

In Figs. 7 to 12, inclusive, I show a modified form of my invention, wherein the improved superheater is shown adapted to a compound locomotive or engine. In this construction, the superheater units or shells are constructed in a similar manner to those previously shown and described; in these figures and those following, similar parts being indicated by similar reference numerals having letter subscripts; and therefore a specific description of the construction of the respective shells or units need not be entered into.

In the construction in Figs. 7 to 12, I provide a third or intermediate superheater unit or shell 48, see Figs. 8 and 9, which intermediate shell or unit is connected with the steam pipe or conduit $30^a$ by means of the elbow connection $31^a$ whereby steam is conveyed from the throttle into the forward end of the intermediate shell or unit 48. This shell or unit 48 is divided in a manner similar to those previously described by means of the intermediate wall or partition $38^a$, which is secured at its forward end to the head or small flue sheet $37^a$ and extends rearwardly to a point short of or forward of the rear head $36^a$, so as to provide the passage $39^a$ whereby communication between the upper and lower compartments of the shell or unit is established. The lower forward end of the superheater shell or unit 48 is provided with a ramified or branched steam conduit, the branches 49 and 50 whereof communicate with the steam-chests of the high pressure cylinders of the locomotive. The two side or adjacently placed superheater units or shells $34^a$ and $35^a$,—which are formed similar to those previously described, that is, provided with an upper and lower compartment having communication with each other by means of the small passage $39^a$,—are provided at their lower forward ends with the steam pipes or conduits 51 and 52 whereby the steam exhausted from the high pressure cylinders is conveyed into the forward lower ends of the superheater units $34^a$ and $35^a$ respectively; and the upper forward ends of these shells or units $34^a$ and $35^a$ are provided with the steam pipes or conduits 53 and 54 respectively, which communicate respectively with the steam-chests of the low pressure cylinders of the locomotive. The different superheater units or shells are preferably provided with the oblong or transversely elongated flues $41^a$ which are arranged and secured in place similar to those previously described. In practice, the steam from the throttle passes through the conduit $30^a$ into the connection or elbow $31^a$, into the forward end of the upper compartment of superheater shell or unit 48 and then passes backward through the superheater unit or shell between the respective flues in a somewhat thin sheet-like form until the steam reaches the rear or fire-box end of the upper compartment of shell or unit 48, whence it passes through passage $39^a$ into the lower compartment of the unit, passing forward therein until it reaches the steam connection or branches 49 and 50 whereby it is admitted to the steam chests of the high pressure cylinders. The steam after passing through the cylinders is exhausted therefrom into conduits or pipes 51 and 52 whereby it is admitted to the lower compartments of the two side shells or units $34^a$ and $35^a$ respectively, allowing the steam to pass rearwardly between the fire flues arranged therein until it reaches the rear or fire-box ends of both units or conduits $34^a$ and $35^a$ when it will pass through the respective passages as indicated at $39^a$, Fig. 7, and into the upper compartment of both sheets or units $34^a$ and $35^a$, whence it passes forward and into the conduits or pipes 53 and 54 whereby it is admitted to the steam-chests of the low pressure cylinders. The steam from the low pressure cylinders in then exhausted through the exhaust pipe or conduit $47^a$ into the smoke-box of the locomotive and out through the smoke-stack 22 thereof. In this construction, I prefer to locate the steam conduits or pipes 53 and 54 to the exterior of the boiler-shell as clearly shown in Figs. 8 and 12, so that the free flow of the gases of combustion through the smoke-box will not be interfered with or obstructed; and at the same time providing a construction wherein some of the steam conduits or pipes are exteriorly located permitting of repairs being readily made. In these figures, I have shown my invention applied to a set of compound cylinders where the compounding feature is embodied within one set of cylinders or castings; but it will be readily understood that the same arrangement of superheater units may be readily applied to a Mallet compound locomotive wherein the high pressure cylinders are located between the front and rear units of the engine and the low pressure cylinders are located in front of the forward unit; this being a cylinder arrangement at present in service of the Mallet type of locomotive.

In Figs. 13 to 18, inclusive, I illustrate another modified form of my invention in which the superheater units consist of concentrically arranged shells and wherein the outer shell is adapted to provide a passage for some of the products of combustion. The invention in this instance is shown applied to an ordinary or simple type of locomotive, in which the boiler-shell $20^b$, smoke-box $21^b$, smoke-stack $22^b$, front flue sheet $23^b$, rear or fire-box flue sheet $24^b$, of the fire-box $25^b$, as well as the flues $26^b$ are arranged in the same manner, as in the previously described constructions, providing the water space $27^b$ and steam space $28^b$ communicating with the usual steam-dome $29^b$ in which the throttle (not shown) is located. The steam-dome $29^b$ controls the flow of steam into the steam pipe or conduit $30^b$ which latter passes forward, through an opening in front flue sheet $23^b$, and is connected with the T pipe or branched connection $31^b$, located in the smoke-box $21^b$; the steam pipe connection or head $31^b$ being provided with the branches $32^b$ and $33^b$ whereby the steam is conveyed to the two superheater shells or units $34^b$ and $35^b$. The shells or units $34^b$ and $35^b$ are constructed in a similar manner to the superheater units or shells 34 and 35, previously described, that is, they are provided with the intermediate wall or partition $38^b$ whereby the shells or units are divided into upper and lower compartments in which compartments are located the flues $41^b$ whereby some of the gases of combustion are conveyed from the fire-box into the smoke-box of the locomotive. The superheater units in this construction, as in the construction shown in Figs. 1 to 6 inclusive, are shown independent of each other, in so far as the flow of steam from the conduit $30^b$ is concerned, supplying the superheated steam to the steam-chests of the cylinders located on the same side of the engine or locomotive as the superheater units or shells; that is, the steam from the throttle is conveyed to the units or shells $34^b$ and $35^b$ by means of the branches $32^b$ and $33^b$ respectively, and the superheated steam is conveyed from units $34^b$ and $35^b$ to the steam-chests of the cylinders by means of conduits or pipes $45^b$ and $46^b$ respectively. In this construction, the superheater units or shells $34^b$ and $35^b$ are inserted within outer casings or shells 55. These casings or shells 55 are placed within the water space $27^b$ of the boiler, namely intermediate of the front flue sheet $23^b$ and the fire-box flue sheet $24^b$; the shells or casings 55, which are identical, are secured within proper openings in the flue-sheets in any suitable manner, but preferably by welding. The shells or casings 55 are of larger diameter than the superheater shells or units $34^b$ and $35^b$ so as to provide a passage for the products of combustion. The superheater units or shells $34^b$ and $35^b$ are inserted within the outer shells or casings 55 so as to extend into close proximity to the fire-box ends of the shells 55, as more clearly shown in Figs. 17 and 18, while the forward ends of the superheater shells or units $34^b$ and $35^b$ extend beyond the front ends of the outer shells or casings 55 and into the smoke-box $21^b$, to permit of steam connections being made therewith whereby the steam is conveyed to and from the respective units. The superheater units and their outer shells or casings are maintained in their proper concentric relation by means of the retaining blocks 56 and 57 more clearly shown in Fig. 16; the blocks 56 being preferably located beneath the vertical axis of the inner shell or casing at the ends of the casings and units, while the blocks 57 are preferably located on the horizontal central line or axis of the units; both ends of the superheater units being supported by and maintained in their relative positions by similar blocks, see Figs. 17 and 18. In this construction as in the previous constructions, the boiler is provided with water in the usual manner, and the steam from the steam-dome $29^b$ is allowed to pass through steam pipe or conduit $30^b$, when the throttle is opened, into the T head or connection $31^b$, and by means of the branches or elbows $32^b$ and $33^b$ into the forward ends of the two superheater units $34^b$ and $35^b$. The steam passes rearwardly through the upper compartments of both superheater units between and around the flues located therein and thence into the lower compartment of the two units or shells $34^b$ and $35^b$ by means of the passage $39^b$, see Figs. 17 and 18. The steam then passes forward through the lower compartments of the superheater units to the front ends thereof and out through pipes or conduits $45^b$ and $46^b$ and into the steam chests of the respective cylinders located on the same sides of the locomotive as the superheater units, and the steam exhausting from the cylinders passes out through the exhaust pipe $47^b$ into the smoke-box $21^b$ and out through smoke stack $22^b$ in the usual manner. In this construction, the hot gases of combustion not only pass through the fire flues 41ᵇ of the compartments of the superheater units but also pass through the annular space or passage 58 intervening between the outer shell or casing 55 and the shell of the superheater units. The outer shells or casings 55 thus not only serve the purpose of providing a passage for the gases or products of combustion whereby the superheater units or shells are additionally heated, but also provides an effective heating surface within the water space of the boiler for the purpose of assisting in the generation of steam. It is evident from the construction shown and described that with this arrangement of my invention, the superheater units may be quickly removed for repairs without interfering with the connection or welded joints between the outer shells and the flue sheets of the boiler.

The modification shown in Figs. 13 to 18 may be readily applied to the compound type of locomotive illustrated in the preceding figures; and while the superheater units in all the figures are shown provided with flat sheet flues having the impressions located so as to prevent collapsing of the flues, it is apparent that round flues may be employed in the respective compartments of the superheating units without departing from the spirit of my invention.

It is evident from the constructions shown and described, that a superheater is provided which may be readily applied to any type of locomotive-boiler, having but few parts which may be made of material employed in every day boiler construction, and wherein heavy complicated and costly castings or headers are entirely eliminated, so that not only the initial cost will be very low but also the cost of maintenance. Furthermore, the constructions of superheaters herein set forth will in no way interfere with the proper operation of the locomotive, but on the contrary, the difficulties and failures heretofore encountered have been entirely eliminated, while at the same time, the boiler heating surfaces and the water within the boiler are not displaced to any detrimental amount, and consequently the amount of steam generated by the boiler will not be appreciably decreased.

By placing the superheater units near the top of the flue sheets of the boiler, and by providing the unobstructed gas passages through the superheater units, the draft of the locomotive is not impaired and consequently the superheater flues will not readily fill up with cinders in coal burning locomotives nor with soot in oil burning locomotives.

In the preferred form of my invention, the steam in the superheater units is compelled to pass between and around the flues in wide thin sheet-like form or streams, thereby bringing most of the particles of steam into contact with the superheating area, so that the rate and amount of superheating will be higher and more efficient than would otherwise be the case, because steam does not take extra heat very readily when passing through a superheater unless it is divided up, as for example into a thin sheet-like form, so that it can come into contact with the superheating area. It is perfectly apparent that any degree of superheat may be easily obtained by varying the amount of heating surface and by varying the amount of travel through the superheater units.

I have shown and described various modifications of my invention and illustrated their application in the preferred forms, but the constructions may be somewhat modified without, however, departing from the spirit of my invention.

What I claim is:—

1. In combination with the high pressure and low pressure cylinders of a locomotive, a steam superheater comprising two or more adjacently arranged shells or units, one of the shells or units being located in the path of the steam intermediate of the steam-dome of the locomotive and the high pressure cylinders, the other shell or unit being located in the path of the steam intermediate of the high pressure cylinders and the low pressure cylinders, means arranged in each shell or unit whereby the steam is compelled to pass back and forth on opposite sides of the longitudinal horizontally disposed center line of the shells and intermediate of the ends of the different shells or units, and flues arranged within the shells or units and extending from end to end whereby the gases of combustion are conveyed through the shells or units.

2. A superheater, comprising an outer or gas-conveying shell or casing, an inner or steam-receiving shell or casing, flues adapted to convey products of combustion arranged within the inner casing so as to compel the steam to flow through the casing in thin sheet-like form, and steam connections intermediate of the source of supply of steam to be superheated and the inner casing and intermediate of the last approached point in said casing and the steam chests of the cylinders.

3. In a superheater for locomotive boilers, an outer or heat-conveying shell or casing, an inner or steam-receiving shell or casing closed at both ends thereof and provided with a diaphragm or partition whereby the shell interior is divided into several compartments communicating with each other at points removed from the saturated steam inlet point of one of the components, flat sided gas conveying flues arranged within the different compartments so as to produce narrow passages for the steam and compel it to travel therethrough in thin sheet-like form, means intermediate of the source of steam supply to be superheated and the end of one of the compartments of the inner shell or casing for conveying the steam thereto, and means intermediate of the last approached end of the other compartment of said inner shell or casing, whereby the superheated steam is conveyed to the steam chests of the cylinders.

4. A superheater, comprising an outer or gas-conveying shell or casing, an inner or steam-receiving shell or casing provided with heads at both ends thereof, a diaphragm or partition whereby the inner shell is divided into two separate compartments communicating with each other at their ends, gas-conveying flues arranged longitudinally in the compartments of the inner shell and intermediate of the heads at opposite ends of the inner shell, and steam-connections intermediate of the source of steam to be superheated and one of the compartments of the inner shell at a point removed from the point of communication between the compartments, and intermediate of the last approached point of the other compartment of the inner shell and the steam chests of the cylinders.

5. In combination with the high pressure and low pressure cylinders of a locomotive, a steam superheater comprising a steam-receiving shell located in the path of the steam from the steam-dome of the locomotive to the high pressure cylinders and from the latter to the low pressure cylinders, the shell being provided with a partition whereby the shell interior is divided into separate compartments, flat-sided gas conveying flues arranged on both sides of said partition so as to compel the steam to flow through the compartments in thin sheet-like form, and means intermediate of the source of supply, the high pressure cylinders and the low pressure cylinders, whereby the steam is conveyed to and from the superheater and the high pressure cylinders and to the low pressure cylinders successively.

HENRY W. JACOBS.

Witnesses:
GEORGE HEIDMAN,
R. E. WIGHTON.

Copies of this patent may be obtained for five cents each, by addressing the "Commissioner of Patents, Washington, D. C."